Aug. 1, 1972   W. P. BAZINET, JR., ET AL   3,681,164
HIGH TEMPERATURE TERMINATION FOR FIBER OPTIC BUNDLE
Filed April 7, 1969

*INVENTOR.*
WILFRED P. BAZINET Jr.
BY JOHN E. SALCE

*ATTORNEY*

United States Patent Office 3,681,164
Patented Aug. 1, 1972

3,681,164
HIGH TEMPERATURE TERMINATION FOR FIBER OPTIC BUNDLE
Wilfred P. Bazinet, Jr., Webster, and John E. Salce, Southbridge, Mass., assignors to Noma-World Wide, Inc., Chicago, Ill.
Filed Apr. 7, 1969, Ser. No. 814,102
Int. Cl. B32b 1/00; G02b 5/16
U.S. Cl. 156—294                7 Claims

ABSTRACT OF THE DISCLOSURE

A fiber optic termination suitable for higher temperature applications is formed using a ceramic-based bonding agent; the fiber bundle is inserted through the termination end plug and the bonding agent applied to the tips of the fibers; the fiber bundle is then pulled back through the plug withdrawing the fiber tips into the plug until the tips are flush with the plug termination end; the termination is completed by binding the fiber optic bundle in the portion emerging from the other end of the plug with an elastic material thereby isolating the brittle ceramically bonded region of the fiber bundle from the flexing portion of the bundle.

---

It presents a problem in fiber optic terminations to achieve fittings suitable for high temperature use, yet having characteristics compatible with the flexing of the run of fiber optic cable, especially where the fiber optic cable leaves the rigid termination end plug. This invention provides for a solution to this problem, using a ceramic bond for the bundle at the high temperature sensing end in combination with an elastic material at the termination plug end leading to the fiber optic bundle run. These and other advantages will be apparent from the description in conjunction with the figures in which:

Figure 1:
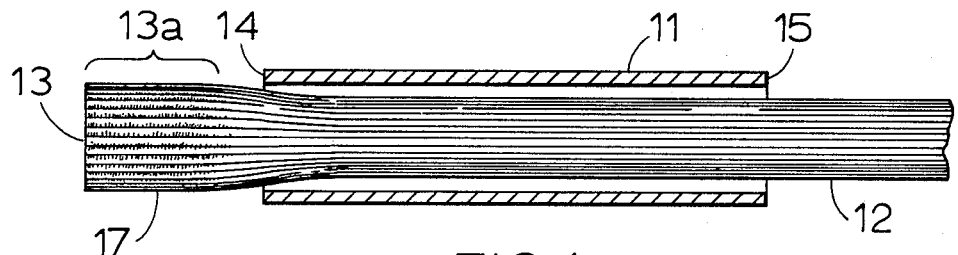
FIG. 1 is a cross-sectional representation of a fiber bundle inserted through a termination plug so that a high temperature bonding material may be applied to the fiber tips.

Referring to FIG. 1, an end plug 11 is employed which is suitable for high temperature applications, the material of plug 11 being such as high temperature glass, stainless steel, brass, or the like. A fiber bundle 12, which is to have the termination applied, is inserted through plug 11 so that fiber tips 13 protrude a short distance from terminating end 14 of plug 11; a few inches is generally sufficient. In practice, it has been found that the size of bundle 12, considering the number of fibers therein, should be selected to occupy about 90% of the internal diameter of plug 11; that is, an allowance of 10% is made for the bonding agent to occupy the insterstices between individual fibers, the combination of fibers 12 and the bonding agent fully occupying the internal diameter of plug 11.

A high temperature ceramic bonding agent 17 is applied to ends 13 of bundle 12, for a distance of an inch or so, designated as region 13a. A convenient method of application is by dipping portion 13a directly into the bonding agent. A bonding agent is employed, including any of several inorganic silicaceous or oxide ceramic cements. Typical characteristics include a high temperature softening point of 1500° F. once it is cured at 800° F. A low temperature solder glass composition could be used alternatively instead of the ceramic cement. Also it is possible to use a litharge-glycerin cement as another alternative.

Figure 2:
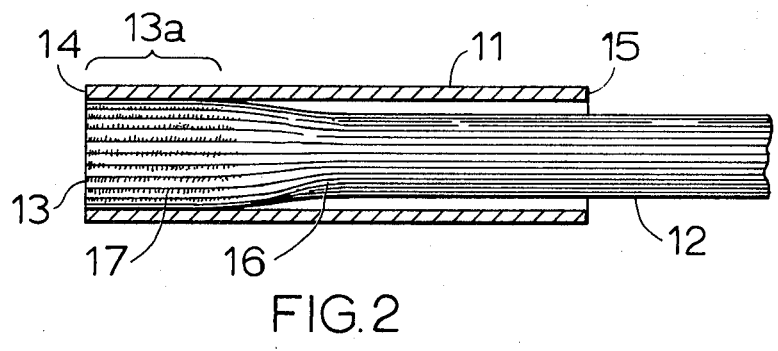
FIG. 2 is a cross-sectional representation of the termination plug showing the fiber bundle pulled back to the position at which the high temperature bonding agent may set.

FIG. 2 shows the bundle 12 withdrawn into plug 11 until fiber tips 13 are flush with termination end 14 of plug 11. Bonding region 13a thereupon occupies the first inch or so of the termination. It will be noted that during the withdrawing process individual fiber breakage may occur if the quartz particles in the bonding agent are not sufficiently fine, or if an attempt is made to pack too many fibers into the dimensions provided for by the inside diameter of plug 11. Some increase in the number of fibers includable without breakage may be obtained if the process is conducted at a temperature elevated above room temperature. Ordinarily 10% less fibers are employed than the theoretical maximum if there could be perfectly close compacting of the fibers. If the viscosity of the bonding agent is reduced, a larger number of fibers may be employed, it being required that the fibers be pulled into place without any significant amount of fiber breakage occurring. Breakage may be determined readily by transmission test, but a very convenient method is listening to fiber snapping during the process of aligning tips 13 with end 14 of plug 11.

Figure 3:
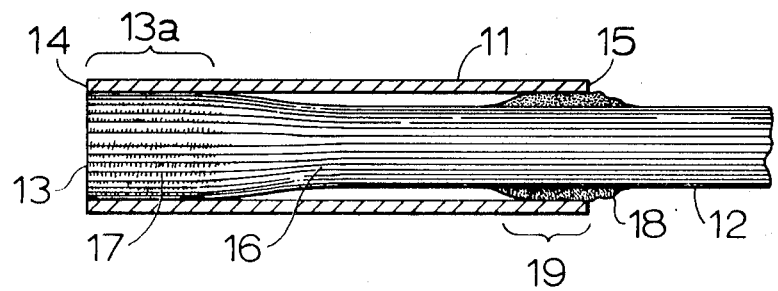
FIG. 3 shows the termination plug after the application of the elastic material to its other end.

After alignment of bundle 12 with plug 11, an additional process step is performed in which an elastic material 18 such as Silastic RTV is applied to region 19 of bundle 12, to bind bundle 12 to the emerging end 15 of plug 11. FIG. 3 depicts the termination after the application of elastic material 18. The elastic material should be selected to withstand the anticipated temperature. Silicone caulking materials are also useful for this. This step aids in preventing breakage of the fibers of bundle 12 in region 16, the region at which the fibers emerge from the ceramic bonding agent 17. It is particularly found that with the use of a bonding agent incorporating quartz particles, the fibers exhibit extreme brittleness where they emerge from the bonding material 17. Application of an elastic material provides for a practical coupling of the fiber bundle to end 15 of plug 11.

It is found a termination product of the process described is suitable to applications such as high intensity arc applications working at a temperature of 200° F. Terminations of this sort have been operated at temperatures up to 1000° F. for periods of at least ½ hour without optical or mechanical deterioration of the assembled bundle and its terminations.

What is claimed is:
1. A method for producing a termination for a fiber optic bundle suitable for high temperature applications by the steps of: inserting the fiber tips of a fiber optic bundle entirely through a tube-like termination plug having first and second ends so that said fiber tip ends of the fiber optic bundle protrude from said first end and so that the substantial length of said fiber bundle extends from said second end, applying a high temperature bonding agent to said fiber optic bundle tip end and a limited distance along the bundle thereby defining a bonding region withdrawing said fiber tip ends of said fiber optic bundle into said termination plug so that bonding region of said fiber optic bundle is positioned within said termination plug adjacent said first end whereby said bonding agent extends from said first end of said termination plug for a limited distance therein to form a limited region of rigid bonding adjacent said first end of said termination plug, and applying a permanently elastic binder to said fiber optic bundle at said second end of said termination plug to form an elastic bond between said bundle and an inner portion of said second end of said termination plug so that flexing of the length of said fiber optic bundle extending from said second end of said termination plug is effectively isolated by said elastic binder from any substantial disturbance of said limited region of rigid bonding adjacent said first end of said termination plug whereby fiber breakage due to rigid constraint of the ter- mination of a flexible fiber optic bundle is substantially reduced.

2. The method of claim 1 employing a ceramic material for said high temperature bonding agent.

3. The method of claim 2 in which said limited distance is in the range of under one inch.

4. The method of claim 1 in which the step of withdrawing said fiber tip ends performed to align the ends of the fiber tips with said first end of said termination plug.

5. The method of claim 1 in which the step of inserting is performed employing a size of fiber bundle allowing for coating of individual fibers of said fiber optic bundle in the step of applying a high temperature bonding agent to said fiber tip ends so that the step of withdrawing may be performed without excessive fiber damage.

6. The method of claim 1 employing inorganic oxide ceramic cement for said high temperature bonding agent.

7. The method of claim 1 employing inorganic oxide ceramic cement modified by a reduction of its particle sizes for said high temperature bonding agent.

References Cited
UNITED STATES PATENTS

| | | | |
|---|---|---|---|
| 2,996,419 | 8/1961 | Schmick | 156—296 X |
| 3,148,967 | 9/1964 | Hicks, Jr. | 156—296 X |
| 3,183,143 | 5/1965 | Harris | 156—296 X |
| 3,224,851 | 12/1965 | Hicks, Jr. | 156—296 X |
| 3,301,648 | 1/1967 | Sheldon | 156—296 X |

CARL D. QUARFORTH, Primary Examiner

R. S. GAITHER, Assistant Examiner

U.S. Cl. X.R.

156—180, 296; 350—96 B